(12) United States Patent
Guguen et al.

(10) Patent No.: US 9,692,338 B2
(45) Date of Patent: Jun. 27, 2017

(54) AUTOMATIC AND ADAPTIVE DEFLUXING DEVICE AND METHOD IMPLEMENTING SUCH A DEVICE

(71) Applicant: THALES, Courbevoie (FR)

(72) Inventors: Stéphane Guguen, Chatou (FR); Arnaud Dal, Chatou (FR); Thomas Girier, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/884,528

(22) Filed: Oct. 15, 2015

(65) Prior Publication Data

US 2016/0111992 A1    Apr. 21, 2016

(30) Foreign Application Priority Data

Oct. 16, 2014    (FR) ...................................... 14 02329

(51) Int. Cl.
*H02P 21/00* (2016.01)

(52) U.S. Cl.
CPC ...... *H02P 21/0089* (2013.01); *H02P 21/0035* (2013.01)

(58) Field of Classification Search
CPC .................................................. H02P 21/0035
USPC ............................. 318/400.02, 400.01, 700
See application file for complete search history.

(56) References Cited

U.S. PATENT DOCUMENTS

| | | | |
|---|---|---|---|
| 5,877,607 A * | 3/1999 | Masaki | B60L 7/20 318/807 |
| 6,952,089 B2 * | 10/2005 | Matsuo | H02M 7/53873 318/801 |
| 9,178,458 B2 * | 11/2015 | Yamazaki | H02P 21/0039 |
| 2014/0125261 A1 | 5/2014 | Yamazaki et al. | |

FOREIGN PATENT DOCUMENTS

EP    0 638 457 A2    2/1995

* cited by examiner

*Primary Examiner* — David S Luo
(74) *Attorney, Agent, or Firm* — Baker & Hostetler LLP

(57) ABSTRACT

A vector control driving device is provided for an electric motor receiving an operating setpoint, with stator windings receiving a driving current and producing a rotating magnetic field, the windings generating a voltage at terminals of the motor, a rotor producing a magnetic field to follow the rotating magnetic field, the device generating current in a vector domain, and configured to carry out a transform of the current from the vector domain to a real domain allowing for generation of the driving current, and configured to carry out an inverse transform of a parameter measured in the real domain on the stator windings into a transform of the parameter in the vector domain, and comparing the value of the inverse transform of the parameter with a predefined maximum parameter value, which can drive the generating of the current in the vector domain. An automatic and adaptive defluxing method is provided.

9 Claims, 3 Drawing Sheets

AUTOMATIC AND ADAPTIVE DEFLUXING DEVICE AND METHOD IMPLEMENTING SUCH A DEVICE

CROSS-REFERENCE TO RELATED APPLICATION

This application claims priority to foreign French patent application No. FR 1402329, filed on Oct. 16, 2014, the disclosure of which is incorporated by reference in its entirety.

FIELD OF THE INVENTION

The invention lies in the field of motor drive (this also includes electric machines) with alternating currents. It relates to an automatic and adaptive defluxing device. The invention relates also to an automatic and adaptive defluxing method implementing such a device.

BACKGROUND

In the field of the driving of motors with alternating currents, whether of synchronous or asynchronous motor type, vector control is commonly used.

Vector control is a generic term denoting all the controls that take real time account of the equations of the system that it controls. The name of these controls stems from the fact that the final relationship is vectorial as opposed to scalar controls. The relationships thus obtained are much more complex than those of scalar controls, but, on the other hand, they make it possible to obtain better performance levels in transient regimes.

For an alternating current motor, there is an operating limit. This is the limitation on the power which is imposed by the power source. In effect, a current supply is produced from a current-regulated voltage source. This source is imperfect and it is limited in power by the voltage of the DC power supply bus.

In the most basic mode of operation of vector control, where the autopiloting angle is kept constant at 0, there is a limit speed, called basic speed, beyond which it is no longer possible to maintain the maximum current (and therefore the maximum torque) because of the voltage limitation of the power source. The difference between this limit voltage and the electromotive force (known also by its abbreviation emf) of the machine in fact becomes insufficient to continue to operate at maximum current.

Beyond the basic speed, control of the regulation loops is lost.

Beyond the basic speed, if there is a desire to continue to control the torque of the machine, it is necessary to deflux (or de-excite) as for direct current machines. The maximum operating power, limited by the power source, is then kept constant and the maximum torque decreases.

This operation is called operating in overspeed mode and this is obtained by defluxing.

The current defluxing techniques are based on control laws derived from the equations of the parameters of the machine. This type of operation presents two major drawbacks. First of all, it is necessary to know the physical parameters of the machine such as, for example, the direct axis inductance of the armature, the quadrature axis inductance of the armature, the resistance of the armature, etc. Furthermore, the machines may be required to operate in non-linear zones in which the equations of the control laws are no longer necessarily borne out.

The knowledge of the parameters of the machine is not always obvious because the value of the parameters can vary as a function of the frequency of use of the machine, of the temperature and of the saturation of the electromagnetic materials.

Furthermore, certain parameters of the machine are sometimes held exclusively by the designer of the machine and are not communicated to the manufacturer responsible for producing the motor control.

Since the current defluxing techniques are based on a precise knowledge of the parameters of the machine, it is essential to systematically re-adapt the defluxing control as soon as the motor to be driven is changed.

Currently, once the linear mode control laws are established, an experimental phase is necessary to be able to weight the parameters of the machine as a function of different physical parameters such as speed of rotation, temperature and saturation of the machine. In other words, in addition to re-adapting the defluxing control to each new machine, it is also necessary to perform additional experimental tests to adapt the parameters.

The defluxing can easily be done on a wound inductor machine. On the other hand, in the case of permanent magnet machines, the defluxing is obtained by injecting currents generating a demagnetizing field.

In the latter case, the effectiveness of the defluxing can be obtained only by virtue of sophisticated controls based on a precise knowledge of the parameters of the machine which will make it possible, through equations, to implement the control laws of the motor.

SUMMARY OF THE INVENTION

The present invention proposes dispensing with the knowledge of the parameters of the machine in the defluxing technique and thus producing an automatic and adaptive defluxing principle.

To this end, the subject of the invention is a vector control driving device for an electric motor suitable for receiving an operating setpoint, the motor comprising:
  a stator comprising windings, suitable for receiving a driving current and producing a rotating magnetic field, the windings of the stator generating a voltage at the terminals of the motor,
  a rotor comprising permanent magnets producing a magnetic field intended to follow the rotating magnetic field,
  comprising:
    a means for generating a current in a vector domain,
    a computation means configured to carry out a transform of the current (Idref) from the vector domain to a real domain allowing for the generation of the driving current,
    an inverse computation means configured to carry out an inverse transform of a parameter measured in the real domain on the stator windings into a transform of the parameter in the vector domain,
    a means for comparing the value of the inverse transform of the parameter with a predefined maximum value of the parameter, the result of which makes it possible to drive the means for generating the current in the vector domain.

Advantageously, the current generated by the means for generating the current in the vector domain is a direct setpoint current established in Park coordinates and the computation means is configured to receive a quadrature setpoint current established in Park coordinates and proportional to the operating setpoint.

According to one embodiment, the parameter measured in the real domain is the voltage at the terminals of the motor.

According to another embodiment, the means for generating the current is a defluxing corrector delivering the current:
zero if the value of the inverse transform of the parameter is less than the predefined maximum parameter value Dmax or
non-zero if the value of the inverse transform of the parameter is greater than or equal to the predefined maximum parameter value Dmax.

According to another embodiment, the means for generating the current is a proportional integral defluxing corrector.

According to another embodiment, the means for generating the current is an integral defluxing corrector.

Another subject of the invention is a method for vector control driving of an electric motor by a device according to the invention, characterized in that it comprises the following steps:
injection of a current intended to modify the magnetic field produced by the stator so that the parameter corresponds to the operating setpoint.

Advantageously, the method according to the invention comprises a preliminary step of comparison of the value of the inverse transform of the parameter with a predefined maximum parameter value.

According to one embodiment, the method comprises a step of generation of a current that is zero if the value of the inverse transform of the parameter is less than the predefined maximum parameter value.

According to another embodiment, the method comprises a step of generation of a current Idref that is non-zero if the value of the inverse transform of the parameter is greater than or equal to the predefined maximum parameter value.

BRIEF DESCRIPTION OF THE DRAWINGS

The invention will be better understood and other advantages will become apparent on reading the detailed description of an embodiment given by way of example, the description being illustrated by the attached drawing in which.

For clarity, the same elements will bear the same references in the different figures.

DETAILED DESCRIPTION

In this application, we will be essentially describing permanent magnet motors. It should be noted that the invention applies also to wound rotor motors by varying the current in the rotor.

Figure 1:
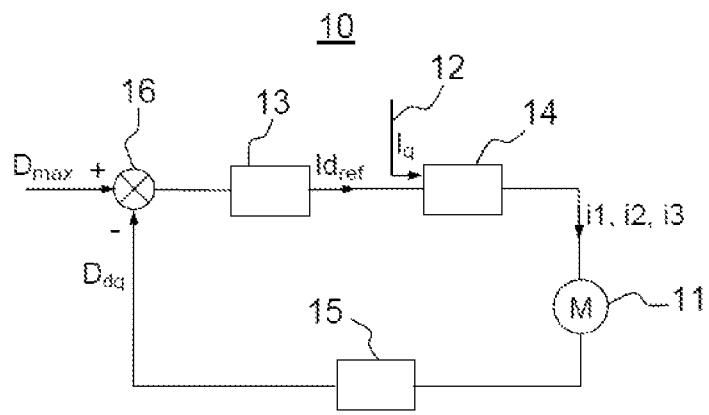
FIG. 1 schematically represents a vector control driving device for a permanent magnet motor according to the invention.

FIG. 1 schematically represents a vector control driving device 10 for a permanent magnet motor 11 according to the invention.

A scalar model does not make it possible to know the modulus and the orientation of a magnetic field. In order for them to be determined, another model is based on basic relationships of the motor 11. For that, a mathematical transformation is used which notably makes it possible to replace three windings staggered at 120° by two windings (denoted d and q) in quadrature and secured to the rotor of the motor 11. In other words, to be in a plane linked to the rotor, two successive transformations are carried out. The first transformation makes it possible to adjust the three-phase model to a two-phase model. The second transformation allows for a Fresnel-type representation by modelling the machine in a rotating reference frame linked to the rotor. Thus, from a real domain, a mathematical transformation, or transform, makes it possible to manipulate quantities in a vector domain.

The vector control driving device 10 for the permanent magnet motor 11 is suitable for receiving an operating setpoint 12. The operating setpoint 12 can be a speed setpoint or else a torque setpoint to be delivered by the motor 11. The motor 11 comprises a stator comprising windings. The stator is suitable for receiving a driving current and producing a rotating magnetic field, the windings of the rotor generating a voltage fcem at the terminals of the motor 11. This voltage is commonly called back-electromotive force. The motor 11 comprises a rotor comprising permanent magnets producing a magnetic field intended to follow the rotating magnetic field. According to the invention, the driving device 10 comprises a means 13 for generating a current Idref in a vector domain. The device also comprises a computation means 14 configured to carry out a transform of the current Idref from the vector domain to a real domain allowing for the generation of the driving current i1, i2, i3 for the three-phase current. The device 10 comprises an inverse computation means 15 configured to carry out an inverse transform of a parameter measured in the real domain on the stator windings of the motor 11 into a transform of the parameter Ddq in the vector domain. The parameter measured in the real domain can for example be a voltage fcem at the terminals of the motor, also commonly referred to by the term back-electromotive force. The inverse computation means 15 in this case carries out an inverse transform of the voltage fcem measured in the real domain on the stator windings of the motor 11 into a transform of the voltage Ddq in the vector domain.

The device 10 finally comprises a means 16 for comparing the value of the inverse transform of the parameter Ddq with a predefined maximum parameter value Dmax, the result of which makes it possible to drive the means 13 for generating the current Idref in the vector domain.

The quantities of the real domain correspond to the real quantities that are measured on the device 10. A real voltage or a real current can notably be cited.

The vector domain refers to a domain in which a quantity is decomposed into two components on a direct axis d and a transverse axis q. The vector domain corresponds to a rotating reference frame linked to the magnetic field of the stator.

Thus, the current Idref generated by the means 13 for generating the current in the vector domain is a direct setpoint current established in Park coordinates and the computation means 15 is configured to receive a quadrature setpoint current Iqref established in Park coordinates and proportional to the speed (or torque) setpoint that the motor 11 receives.

Figure 2:
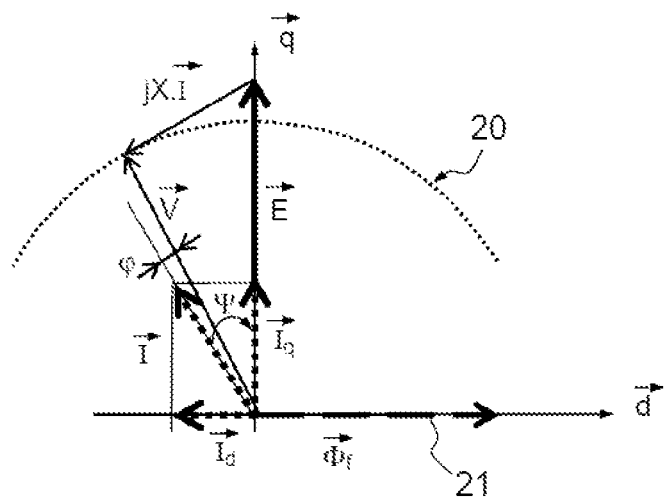
FIG. 2 represents a Fresnel diagram in defluxed operating regime.

FIG. 2 represents a Fresnel diagram in defluxed operating regime. In the Fresnel diagram represented in FIG. 2, the two axes, direct d and transverse q, of the vector domain can be seen. The motor exhibits a voltage limit 20. Because of the voltage limit 20, in normal operation, the motor 11 has a limit speed, called basic speed, beyond which it is no longer possible to maintain the maximum current, and therefore the maximum torque. To extend the speed range, the magnetic flux must be reduced in the direct axis d. For that, a current generating a demagnetizing flux is injected which allows for a reduction of the overall induced voltage. In other words, the lowering of the inductive field in vector control is done by regulating the current Idref as a function of the speed.

More specifically, the means 13 for generating the current is a defluxing corrector delivering the current Idref that is zero if the value of the inverse transform of the parameter is less than the predefined maximum parameter value (that is to say less than the value Dmax) or non-zero if the value of the inverse transform of the parameter (that is to say the voltage Ddq) is greater than or equal to the predefined maximum parameter value Dmax.

Figure 3:
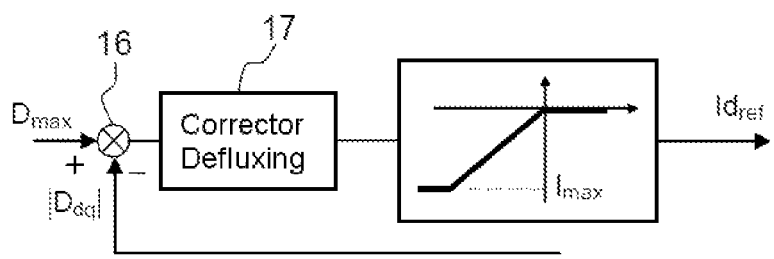
FIG. 3 schematically represents a means for generating a current of the device according to the invention.

FIG. 3 schematically represents such a means 13 for generating a current Idref of the device 10 according to the invention. The comparison means 16 determines whether the value of Ddq is less than or greater than or equal to the value Dmax. The defluxing corrector 17 then delivers the corresponding current Idref. The defluxing corrector 17 can for example be a proportional integral corrector or a purely integral corrector.

It should be noted that the current Idref is zero if the value of Ddq is less than the value Dmax. When the value of Ddq is greater than the value Dmax, the corrector 17 generates a negative current Idref. Thus, as represented in FIG. 2 on the direct axis d, the current Idref reduces the inductive flux 21, and thus the back-electromotive force at the terminals of the motor 11. That makes it possible to extend the speed range of the motor 11, and the voltage does not depart from the circle of the limit voltage 20 (represented in FIG. 2).

Figure 4:
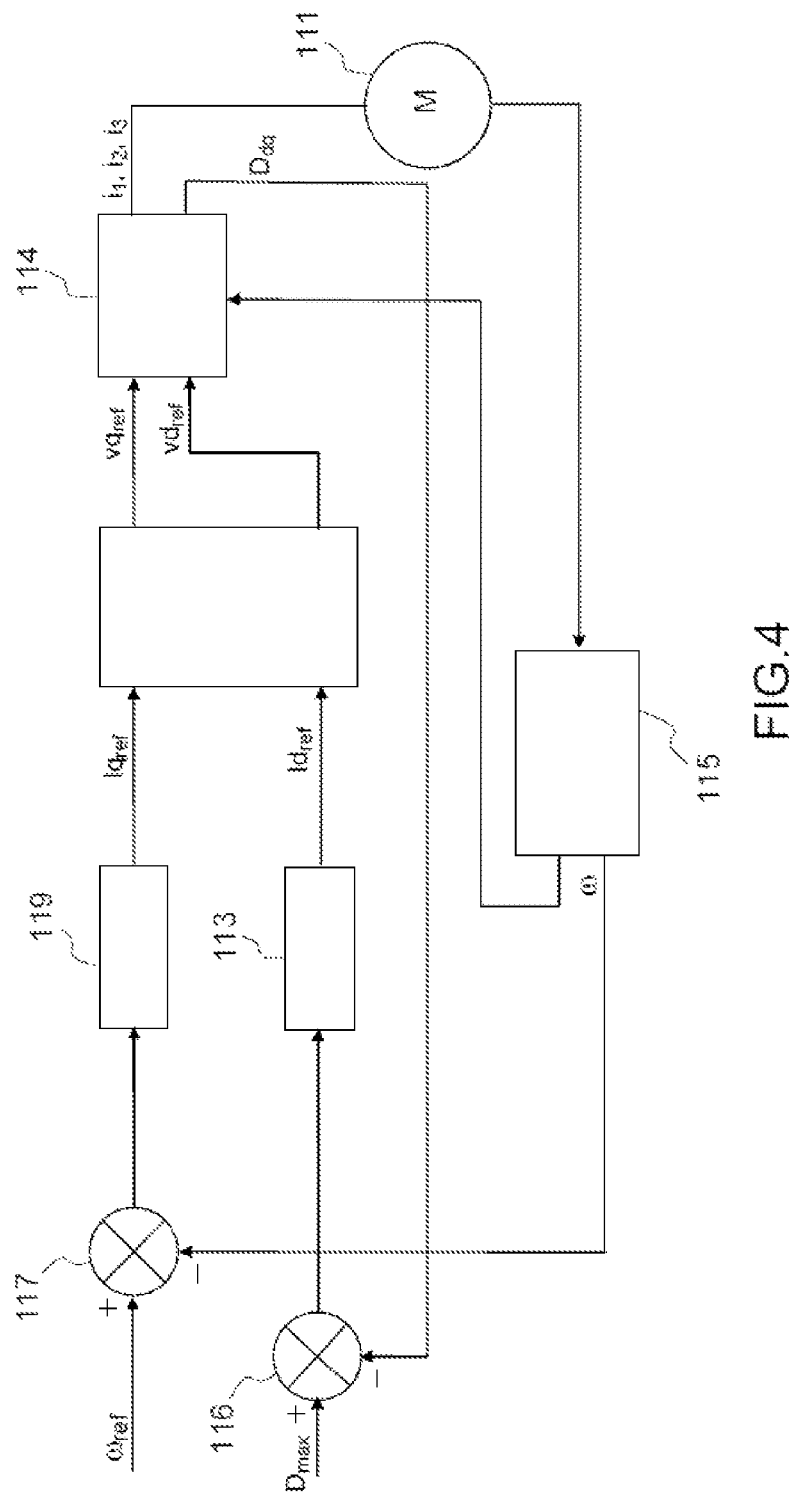
FIG. 4 schematically represents an example of vector control driving of a permanent magnet motor according to the invention.

FIG. 4 schematically represents an example of vector control driving of a permanent magnet motor 111 according to the invention. The motor 111 receives, from a computation means 114, driving currents i1, i2 and i3. An inverse computation means 115 is configured to carry out an inverse transform of the speed measured at the terminals of the motor 111 into a transform of the speed to give the value w, corresponding to the electrical pulsing obtained from the electrical frequency f by the operation $w=2\pi f$ (the electrical frequency f being itself obtained by multiplying the number of poles of the electric machine by the rotation frequency of the rotor). The value w is transferred to the computation means 114.

More specifically, values vdref and vqref, components of the voltage respectively on the direct axis d and the transverse axis q of the vector domain, are computed from the currents Id, Iq and from the electrical pulsing w. The values vdref and vqref are reduced to duty cycle, corresponding to an image of the voltage lying between 0 and 1. The modulus of the duty cycle is the value Ddq. In other words, the invention makes it possible to work with voltages in the real domain and images of these voltages in the vector domain, without any need for a voltage sensor. A comparison means 116 compares the value of the inverse transform of the voltage Ddq with the predefined maximum value of the voltage Dmax. The result of this comparison makes it possible to drive a means 113 for generating a current in the vector domain. Depending on the result of the comparison, the generation means 113 generates a current Idref that is zero or non-zero. The current Idref is zero if the voltage Ddq is less than the maximum voltage Dmax. And, the current Idref is non-zero if the voltage Ddq is greater than or equal to the maximum voltage Dmax. The current Idref is then directed towards the computation means 114 to generate the driving currents i1, i2, i3.

In parallel, a speed value of the motor 111 is transmitted to the inverse computation means 115. The inverse computation means 115 carries out an inverse transform of the speed measured at the terminals of the motor 111 in the real domain into a transform of the speed to give the value w. A comparison means 117 compares the value of the inverse transform of the speed w with a predefined maximum value of the speed wref for the motor 111 not to exceed a maximum speed. The result of this comparison makes it possible to drive a speed regulator 119 delivering a current Iqref in the vector domain. The current Iqref is transmitted to the computation means 114 as operating speed setpoint for the motor 111. Represented in the Fresnel diagram of FIG. 2, the currents Idref and Iqref in the vector domain are in fact the two components of a current I represented vectorially and thus defining the autopiloting angle PSI. Also, the driving currents i1, i2 and i3 of the motor 111 are generated as a function of the values of Idref and Iqref.

The example of vector control driving of the motor 111 here takes into account a speed setpoint. Nevertheless, as already specified previously, it is perfectly possible to drive the motor 111 with a torque setpoint.

It is thus possible to obtain a defluxing by adjusting the autopiloting angle PSI, by creating a demagnetizing flux component. The weakening of the inductive field in vector control is done by regulating the current Idref as a function of the speed. At low and average speed, Idref is commanded to zero. When the speed increases to reach the limits imposed by the back-electromotive force which creates a voltage drop such that the motor can no longer accelerate, the current Idref is increased. Increasing the current Idref reduces the inductive flux and thus the back-electromotive force, which makes it possible to extend the speed range of the motor.

In other words, the injection of the current Idref makes it possible to deflux the motor automatically. In effect, the current Idref imposed by the driving is not derived from complex equations but is directly defined as a function of a single criterion which is the back-electromotive force at the terminals of the motor. Because of this, the defluxing is automatic because it is not predefined by equations or tabulations. And, the defluxing is also adaptive: when the motor to be driven is changed, the device adapts to the variations of physical parameters such as the speed of the motor, but also the temperature and the saturation of the motor.

Thus, it is no longer necessary to know the physical parameters of the machine, often unknown to the user. And no systematic readaptation of the defluxing control is necessary when changing the motor to be driven.

Figure 5:
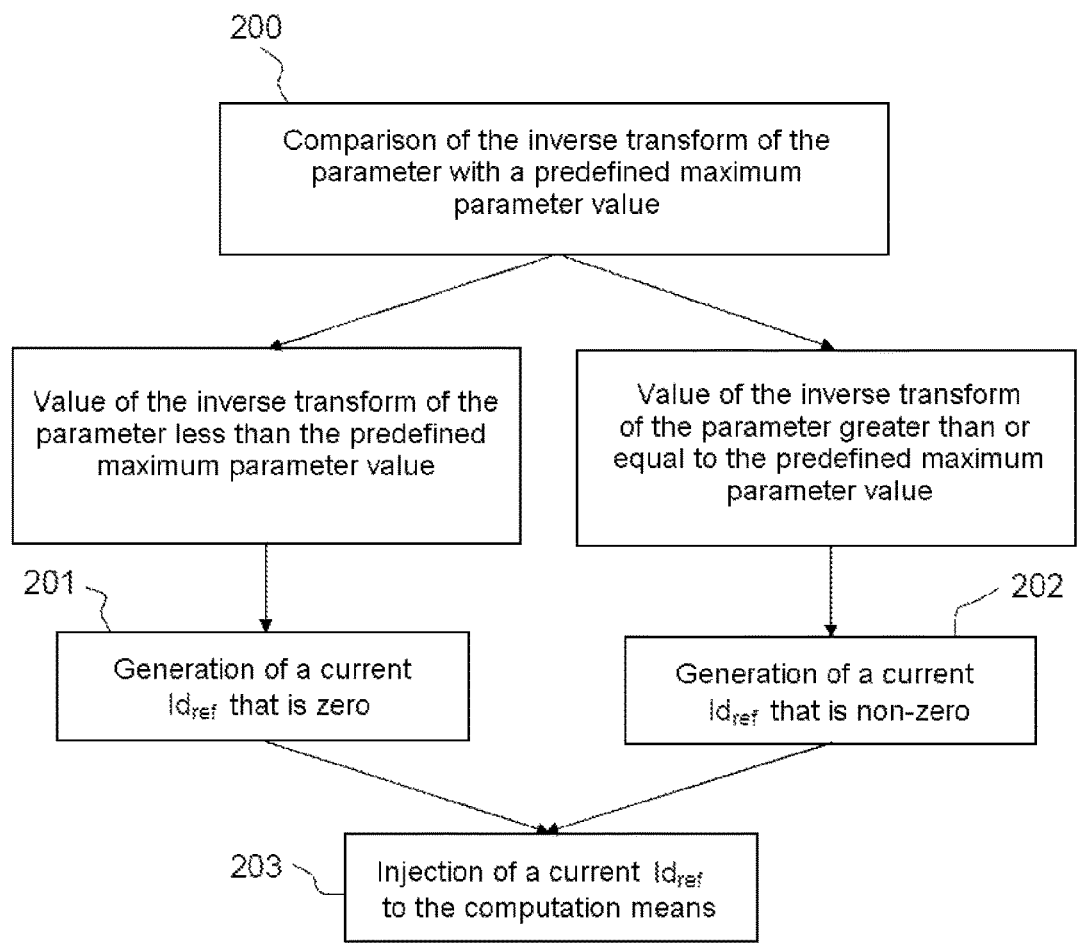
FIG. 5 represents the steps of a method for vector control driving of a permanent magnet motor according to the invention.

FIG. 5 represents the steps of a vector control driving method for a permanent magnet motor according to the invention.

The method according to the invention comprises a preliminary step 200 of comparison of the value of the inverse transform of the parameter with a predefined maximum parameter value. Depending on the result of the comparison, the method comprises a step of generation of a zero current (step 201) if the value of the inverse transform of the parameter is less than the predefined maximum parameter value. If the value of the inverse transform of the parameter is greater than or equal to the predefined maximum parameter value, the method comprises a step of generation of a non-zero current Idref (step 202). Finally, the current is injected to the computation means 14 and is intended to modify the magnetic field produced by the stator such that the parameter (for example the voltage) corresponds to the operating setpoint.

The invention claimed is:

1. A vector control driving device for an electric motor configured to receive an operating setpoint, the motor comprising a stator comprising windings, the stator configured to receive a driving current and produce a rotating magnetic field, the windings of the stator configured to generate a voltage at terminals of the motor, the motor further comprising a rotor configured to produce a magnetic field configured to follow the rotating magnetic field, the driving device comprising:
 a means for generating a current in a vector domain;
 a computation means configured to carry out a transform of the current from the vector domain to a real domain allowing for generation of the driving current;
 an inverse computation means configured to carry out an inverse transform of a parameter measured in the real domain on the windings of the stator into an inverse transform of the parameter in the vector domain; and
 a means for comparing a value of the inverse transform of the parameter with a predefined maximum value of the parameter, the result of which makes it possible to drive the means for generating the current in the vector domain,
 wherein the current generated by the means for generating the current in the vector domain is a direct setpoint current established in Park coordinates, and the computation means is configured to receive a quadrature setpoint current established in Park coordinates and proportional to the operating setpoint.

2. The driving device according to claim 1, wherein the parameter measured in the real domain is the voltage at the terminals of the motor.

3. The driving device according to claim 1, wherein the means for generating the current is a defluxing corrector delivering a zero current if the value of the inverse transform of the parameter is less than the predefined maximum value, or a non-zero current if the value of the inverse transform of the parameter is greater than or equal to the predefined maximum value.

4. The driving device according to claim 3, wherein the means for generating the current is a proportional integral defluxing corrector.

5. The driving device according to claim 3, wherein the means for generating the current is an integral defluxing corrector.

6. A method for vector control driving of an electric motor by a driving device according to claim 1, the method comprising:
 generating a current to modify the magnetic field produced by the stator so that the parameter corresponds to the operating setpoint.

7. The method for vector control driving of an electric motor according to claim 6, further comprising comparing the value of the inverse transform of the parameter with the predefined maximum value.

8. The method for vector control driving of an electric motor according to claim 7, further comprising generating a current that is zero if the value of the inverse transform of the parameter is less than the predefined maximum value.

9. The method for vector control driving of an electric motor according to claim 7, further comprising generating a current that is non-zero if the value of the inverse transform of the parameter is greater than or equal to the predefined maximum value.

* * * * *